Patented June 6, 1950

2,510,725

UNITED STATES PATENT OFFICE 2,510,725

FUNGICIDAL COMPOSITION COMPRISING A 3-PHENYL-2,4-THIAZOLEDIONE

Norman K. Sundholm, Naugatuck, Conn., and Joseph B. Skaptason, Hempstead, N. Y., assignors to United States Rubber Company, New York, N. Y., a corporation of New Jersey No Drawing. Application February 12, 1947, Serial No. 728,193

4 Claims. (Cl. 167—33)

This invention relates to new and useful improvements in a fungicidal composition comprising a 3-phenyl-2,4-thiazoledione. The invention further relates to methods of treating plants, and to methods of protecting organic material subject to attack by microorganisms, as the immunizing of seed, and the mildewproofing of fabrics and other material.

We have found that 3-aryl-2,4-thiazolediones are effective fungicides. The structure of these compounds may be represented by the formula:

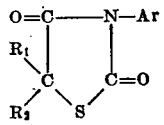

wherein $R_1$ and $R_2$ may be hydrogen or an aliphatic radical, and Ar represents an aromatic radical. The preparation of the 3-aryl-2,4-thiazolediones is well known. In general they are formed by the reaction of a sym. diaryl-thiourea with an alphahalo fatty acid. Examples of 3-aryl-2,4-thiazolediones which are fungicides are:

3-phenyl-2,4-thiazoledione
3-(4-chlorophenyl)-2,4-thiazoledione
3-phenyl-5-methyl-2,4-thiazoledione
3-phenyl-5,5-dimethyl-2,4-thiazoledione
3-(p-methoxy phenyl)-5-ethyl-2,4-thiazoledione
3-(o-chlorophenyl)-5-methyl-2,4-thiazoledione
3-(p-tolyl)-5-n-butyl-2,4-thiazoledione
3-alpha-naphthyl-5-ethyl-2,4-thiazoledione
3-(p-nitrophenyl)-2,4-thiazoledione
3-phenyl-5,5-diethyl-2,4-thiazoledione
3-phenyl-5,5-di-n-propyl-2,4-thiazoledione The 3-aryl-2,4-thiazolediones may be used as seed protectants and disinfectants, and to protect plants, which term includes plant parts, or soil from microorganisms harmful to seeds and plants. They may also be applied to prevent or retard fungus growth and the formation of mildew on organic material, such as wood, fur, rope, hair, feathers, cotton, wool, synthetic organic fibers, and the like. They may be applied as a dust, as in admixture with a powdered solid carrier, such as clay or talc, or they may be applied as a liquid or spray in a liquid carrier, as in solution in a suitable solvent, or suspended in a suitable non-solvent, for example, water. Preferably when applied in aqueous suspension, the composition contains a dispersing agent for the chemical. In seed treatment, the 3-aryl-2,4-thiazolediones are preferably applied to the seed, as by tumbling with the chemical admixed with a powdered solid carrier. In foliage treatment, the 3-aryl-2,4-thiazolediones are preferably applied to the plant parts by spraying with an aqueous suspension of the chemical containing a dispersing agent. The chemicals may be applied to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The 3-aryl-2,4-thiazolediones may be used admixed with carriers that are active of themselves, for example, other fungicides, or bactericides, insecticides, insectifuges, fertilizers, hormones.

The following examples of the effectiveness of various 3-aryl-2,4-thiazolediones as fungicides are given to illustrate the invention. The 3-phenyl-2,4-thiazoledione tested was prepared according to the procedure of Markley and Reid in J. A. C. S. 52, 2140 (1930). The 3-phenyl-5-methyl-2,4-thiazoledione tested was prepared from thiocarbanilide and alpha chloro propionic acid according to the general procedure of Markley and Reid supra. The 3-(p-chlorophenyl)-2,4-thiazoledione was prepared according to the procedure of Dains et al.: J. A. C. S. 43, 615 (1921).

*Example I*

The various 3-aryl-2,4-thiazolediones were sprayed on tomato plants in the form of aqueous suspensions of the chemicals at a dosage of 2000 parts per million (P. P. M.). When the thus treated plants were sufficiently dried, the plants, together with untreated (check) plants, were uniformly inoculated by spraying onto the foliage an aqueous suspension of spores of *Alternaria solani*, the fungus responsible for a serious blight disease of this crop. The plants were placed in an inoculation chamber at 75° F. and 99% humidity for 20 hours, after which they were removed to normal greenhouse conditions. After two days in the greenhouse, the effectiveness of the various 3-aryl-2,4-thiazolediones was determined by counting the blight lesions on the tomato plants treated with the various 3-aryl-2,4-thiazolediones, and comparing with the number of blight lesions on the check plants which were not treated with the chemicals. The number of blight lesions on the plants treated with the various 3-aryl-2,4-thiazolediones and the number of blight lesions on the check plants are shown in columns 1 and 2 of the following table. The percent control by the various 3-aryl-2,4-thiazolediones is shown in the third column of the following table:

| Treatment Chemical | Blight Lesions per Plant | | Control |
| --- | --- | --- | --- |
| | Treated Plants | Check Plants | |
| 3-Phenyl-2,4-thiazoledione | 0 | 199 | Per cent 100 |
| 3-Phenyl-5-methyl-2,4-thiazoledione | 1 | 159 | 99 |
| 3-(4-Chlorophenyl)-2,4-thiazoledione | 24 | 167 | 86 |

Example II

The following table lists the dosage in parts per million (P. P. M.) at which the 3-aryl-2,4-thiazolediones tested inhibit completely the germination of *Alternaria solani* and *Sclerotinia americana* fungi spores on glass slides. The procedure used is that outlined in Phytopathology 33, 627 (1943).

| Chemical | Alternaria solani | Sclerotinia americana |
| --- | --- | --- |
| | P. P. M. | P. P. M. |
| 3-Phenyl-2,4-thiazoledione | 1,000 | 1,000 |
| 3-(4-Chlorophenyl)-2,4-thiazoledione | | 1,000 |
| 3-Phenyl-5-methyl-2,4-thiazoledione | 100 | 100 |

Having thus described our invention, what we claim and desire to protect by Letters Patent is:

1. A fungicidal composition comprising an aqueous suspension of a 3-phenyl-2,4-thiazoledione, said aqueous suspension containing a dispersing agent.

2. A fungicidal composition comprising an aqueous suspension of 3-phenyl-2,4-thiazoledione, said aqueous suspension containing a dispersing agent.

3. A fungicidal composition comprising an aqueous suspension of 3-(4-chlorophenyl)-2,4-thiazoledione, said aqueous suspension containing a dispersing agent.

4. A fungicidal composition comprising an aqueous suspension of 3-phenyl-5-methyl-2,4-thiazoledione, said aqueous suspension containing a dispersing agent.

NORMAN K. SUNDHOLM.
JOSEPH B. SKAPTASON.

REFERENCES CITED

The following references are of record in the file of this patent:

UNITED STATES PATENTS

| Number | Name | Date |
| --- | --- | --- |
| 1,961,840 | Bolton | June 5, 1934 |
| 1,962,109 | Alvord | June 5, 1934 |

OTHER REFERENCES

Chem. Abstracts, vol. 12, p. 1295 (1918). (Copy in Patent Office Library.)